United States Patent
Newton et al.

(10) Patent No.: US 8,422,801 B2
(45) Date of Patent: Apr. 16, 2013

(54) IMAGE ENCODING METHOD FOR STEREOSCOPIC RENDERING

(75) Inventors: Philip Steven Newton, Eindhoven (NL); Wilhelmus Hendrikus Alfonsus Bruls, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 380 days.

(21) Appl. No.: 12/809,219

(22) PCT Filed: Dec. 17, 2008

(86) PCT No.: PCT/IB2008/055381
§ 371 (c)(1),
(2), (4) Date: Jun. 18, 2010

(87) PCT Pub. No.: WO2009/081335
PCT Pub. Date: Jul. 2, 2009

(65) Prior Publication Data
US 2010/0310155 A1 Dec. 9, 2010

(30) Foreign Application Priority Data
Dec. 20, 2007 (EP) .................................. 07301715

(51) Int. Cl.
*G06K 9/36* (2006.01)
(52) U.S. Cl.
USPC ........................................................ 382/232
(58) Field of Classification Search ................. 382/154, 382/232–233; 345/418, 419, 421, 422, 555; 348/42, 51; 708/203
See application file for complete search history.

(56) References Cited

U.S. PATENT DOCUMENTS

| 5,617,334 | A | | 4/1997 | Tseng et al. |
| 5,644,324 | A | * | 7/1997 | Maguire, Jr. ....................... 345/9 |
| 5,831,638 | A | * | 11/1998 | West et al. .................... 345/539 |
| 6,111,979 | A | | 8/2000 | Katto |
| 6,442,331 | B1 | | 8/2002 | Watkins |

(Continued)

FOREIGN PATENT DOCUMENTS

| EP | 0888018 A1 | 12/1998 |
| EP | 1739979 A2 | 1/2007 |

(Continued)

OTHER PUBLICATIONS

Redert et al: "ATTEST: Advanced Three-Dimensional Television System Technologies"; IEEE Proceedings of the First International Symposium on 3D Data Processing Visualization and Transmission (3DPVT'02), Jun. 2002, pp. 313-319.

*Primary Examiner* — Jose Couso

(57) ABSTRACT

An image encoding method that allows stereoscopic rendering basically comprises the following steps. In a primary encoding step (VDE1), a visual image is encoded in accordance with a standard. In an auxiliary encoding step (GRE), stereo-enabling data that is associated with the visual image is encoded as if the stereo-enabling data was an auxiliary image that can be combined with the visual image in accordance with the standard concerned. The stereo-enabling data comprises respective values that indicate respective distances between respective areas in the visual image and a virtual observer. In a composition definition step (CTR1), a composition definition is provided that causes a decoding device, which operates in accordance with the standard, to include the stereo-enabling data as a graphics image in at least one specific area of an output image, which can be transmitted to a display device.

14 Claims, 12 Drawing Sheets

U.S. PATENT DOCUMENTS

| | | |
|---|---|---|
| 6,630,933 B1 | 10/2003 | Van Hook |
| 7,982,733 B2 * | 7/2011 | Wang et al. ............... 345/421 |
| 2007/0052855 A1 | 3/2007 | Lee et al. |

FOREIGN PATENT DOCUMENTS

| | | |
|---|---|---|
| JP | 7240942 A | 9/1995 |
| WO | 9939307 A1 | 8/1999 |
| WO | 0139125 A1 | 5/2001 |
| WO | 2005034035 A1 | 4/2005 |
| WO | 2006004894 A2 | 1/2006 |
| WO | 2008044191 A2 | 4/2008 |

* cited by examiner

DM2 ≡ DMS2
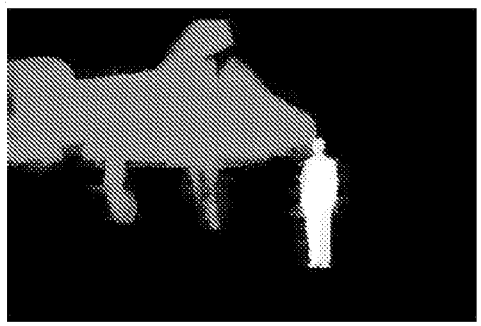
FIG. 12
DP ≡ DPS
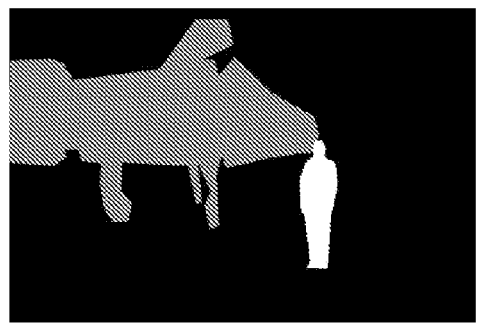
FIG. 13
JX ≡ JXS
```
public void paint (Graphics g)
  { setColor(Color.red);
    g.drawLine(0,40,40,38);
    g.drawLine(40,38,50,54);
    g.drawLine(50,54,114,46);
    g.drawLine(114,46,142,8);
    g.drawLine(114,46,168,8);
    g.drawLine(168,8,170,24);
    g.drawLine(170,24,150,38);
    etc...etc...
  }
```
FIG. 14

VI3 ≡ VIS3

MI ≡ MIS

IMAGE ENCODING METHOD FOR STEREOSCOPIC RENDERING

FIELD OF THE INVENTION

The invention mainly relates to an image encoding method that allows stereoscopic rendering. This image encoding method may be used, for example, to produce optical disks, or other types of data carriers, that comprise a stereoscopic version of a movie, or another type of video. Other aspects of the invention relate to a data carrier, a signal, an image encoder, an image decoder, and a computer program product for a programmable processor.

BACKGROUND ART

A stereoscopic viewing experience, which can also be called a three-dimensional (3-D) viewing experience, can be achieved by presenting different views of a scene to the left eye and the right eye of an observer. These different views represent the scene concerned viewed from slightly different angles, which provides an impression of depth. A stereoscopic rendering system needs to receive data from which the system can derive the different views that need to be presented to a viewer. This stereoscopic data may comprise, for example, a pair of visual images, one of them representing a left-eye view, and the other one representing a right-eye view. This is a classical approach.

Alternatively, stereoscopic data may comprise a so-called depth map that is associated with a visual image. A depth map can be regarded as a set of values, which may be in the form of a matrix. Each value relates to a particular area in the visual image and indicates a distance between a virtual observer and an object in that area. The area concerned may comprise a single pixel or a cluster of pixels, which may have rectangular shape, or any other shape for that matter. A processor is capable of generating different views, which are required for stereoscopic rendering, on the basis of the visual image and the depth map associated therewith. The depth map may be completed with occlusion data that provides additional information about background objects, which are at least partially occluded by foreground objects in the visual image.

The document EP 0 888 018 B1, granted on Jun. 7, 2006, relates to an optical disk in which stereoscopic videos are recorded. A signal for the right eye of a stereoscopic image and a signal for the left eye are compressed into MPEG signals by MPEG encoders (MPEG is an acronym for Moving Pictures Experts Group). These signals are interleaved in a particular fashion so as to obtain a so-called interleaved block, which corresponds with a frame group. The interleaved block is recorded for more than one revolution to more than ten revolutions of the optical disk. It is claimed that the optical disk provides a mono-vision (2-D) with an existing reproducing device, and can provide a stereo-vision (3-D) with a new reproducing device.

SUMMARY OF THE INVENTION

It is an object of the invention to provide a solution that allows a cost-efficient deployment of stereoscopic image rendering. The independent claims define various aspects of the invention. The dependent claims define additional features for implementing the invention to advantage.

The invention takes the following points into consideration. It is possible to elaborate one or more new image encoding standards for stereoscopic rendering. Indeed, work on such standards has begun. However, it may take a relatively long time to finalize such a new standard and, moreover, to successfully introduce the new standard. In the meantime, work on stereoscopic display devices is progressing so that new and improved stereoscopic display devices may be introduced in a near future. These stereoscopic display devices need content.

Moreover, a new standard will require new reproducing devices that can cope with the new standard and, in particular, with data carriers that have been recorded in accordance with the new standard. These new reproducing devices may be relatively costly, which may dissuade a consumer from upgrading from mono-vision to stereo-vision. He or she needs to buy a new display device as well as a new reproducing device, which allow stereoscopic rendering. Moreover, there may only be a relatively small variety of content in a stereoscopic version. Editors will be reluctant to invest in a new standard for producing stereoscopic versions, if only few customers have the necessary equipment to render the stereoscopic versions.

Another point that is taken into consideration concerns available bandwidth and available data capacity. For example, in accordance with the prior art mentioned hereinbefore, two video streams are recorded on optical disk: one video stream for the left eye and another video stream for the right eye. This means that an optical disk that can comprise two hours of mono video, can comprise only one hour of stereo video. Recording and playback time are reduced by half.

Available bandwidth is a point that goes beyond the optical disk, or another data carrier for that matter. There are existing widespread standards for interfacing a display device with a reproduction device, such as, for example, DVI and HDMI (DVI is an acronym for Digital Visual Interface; HDMI is an acronym for High-Definition Multimedia Interface). These standards provide a given bandwidth, which is associated with a given image resolution and a given image rate. In principle, it is possible to provide the display device as well as the reproduction device with two interfaces of, for example, the DVI or the HDMI type, for the purpose of stereoscopic rendering. However, this is a relatively expensive solution. Moreover, existing devices typically comprise a single interface only.

In accordance with the invention, an image encoding method that allows stereoscopic rendering basically comprises the following steps. In a primary encoding step, a visual image is encoded in accordance with a standard. In an auxiliary encoding step, stereo-enabling data that is associated with the visual image is encoded as if the stereo-enabling data was an auxiliary image that can be combined with the visual image in accordance with the standard concerned, the stereo-enabling data comprising respective values that indicate respective distances between respective areas in the visual image and a virtual observer. In a composition definition step, a composition definition is provided that causes a decoding device, which operates in accordance with the standard, to include the stereo-enabling data in at least one specific area of an output image, which can be transmitted to a display device.

The standard concerned may be an existing standard such as, for example, a DVD standard or a Blu-ray disk standard. A stereoscopic display device may readily extract the stereo-enabling data, which is comprised in an output image, in numerous different fashions. Accordingly, there is no need for a new standard in order to make a stereoscopic version of content available to a stereoscopic display device. Neither is there any need for completely new reproducing devices. If needed, an updated firmware version for an existing device will be sufficient to allow stereoscopic rendering. Moreover, an image encoding method in accordance with the invention has a relatively modest impact on available recording and playback time, or even no impact at all. What is more, a single display interface of, for example, the DVI type or the HDMI type, will be sufficient for stereoscopic rendering.

In summary, an existing widespread infrastructure composed of standardized modules can be used as a platform for introducing stereoscopic image rendering. For those reasons, the invention allows a cost-efficient deployment of stereoscopic image rendering.

An implementation of the invention advantageously comprises one or more of the following additional features, which are described in separate paragraphs that correspond with individual dependent claims. Each of these additional features contributes to achieving a cost-efficient deployment of stereoscopic image rendering.

Original stereo-enabling data is preferably compressed so as to obtain the stereo-enabling data that is encoded. Accordingly, a relatively small portion of the output image is sufficient to convey the stereo-enabling data so that a relatively large portion is available for conveying the visual image. This contributes to a high-resolution stereoscopic rendering.

The original stereo-enabling data is preferably sub-sampled so that the stereo-enabling data that is encoded has a resolution that is lower than that of the original stereo-enabling data. This further contributes to a high-resolution stereoscopic rendering. In this respect, it should be noted that a loss of resolution in the stereo-enabling data can be restored so that the sub-sampling need not conflict with a high-resolution stereoscopic rendering.

The composition definition that is provided can cause a decoding device to insert a portion of the stereo-enabling data in at least one of the following sets of lines of the output image: a set of the upper lines and a set of lower lines. This further contributes to a high-resolution stereoscopic rendering, in particular in cases where scenes are relatively wide, which is typically the case for movies.

The stereo-enabling data can be encoded as a graphics image in accordance with at least one of the following two standards: a DVD standard or a Blu-ray disk standard.

The composition definition can be included in a composition segment that is associated with the graphics image.

A drawn picture can be generated, which represents the stereo-enabling data by way of approximation, the drawn picture comprising elementary graphics objects, which can be expressed by means of drawing primitives.

At least one set of drawing primitives can be generated on the basis of the drawn picture.

The drawing primitives can be expressed in the form of a Java program that can be included in an interactive graphics data stream in accordance with a Blu-ray disk standard.

The stereo-enabling data can be encoded as an auxiliary visual image, which is to be displayed in a picture-in-picture fashion.

The composition definition that is provided can cause the decoding processor concerned to insert a scaled version of the visual image into the auxiliary visual image in a picture-in-picture fashion, as if the auxiliary visual image was a main visual image and the visual image a sub-image.

The stereo-enabling data can formed by a mosaic of a depth map, which comprises the respective values that indicate respective distances between respective areas in the visual image and the virtual observer, and at least one conclusion image, which represents one or more background objects that are at least partially occluded by one or more foreground objects in the visual image. The occlusion image contributes to a high-definition stereoscopic rendering.

A menu can be defined that comprises an item for stereoscopic rendering, the item being associated with the composition definition so that when the item for stereoscopic rendering is selected, the decoding device includes the stereo-enabling data in the at least one specific area of the output image, which is to be transmitted to the display device.

A detailed description, with reference to drawings, illustrates the invention summarized hereinbefore as well as the additional features.

BRIEF DESCRIPTION OF THE DRAWINGS

FIGS. 12 and 13 are pictorial diagrams that illustrate a depth map and a drawn picture, respectively, which occur in the alternative stereoscopic video recording system.

FIG. 14 is a pictorial diagram that illustrates a Java graphics program, which can produce the drawn picture illustrated in FIG. 13.

DETAILED DESCRIPTION

Figure 1:
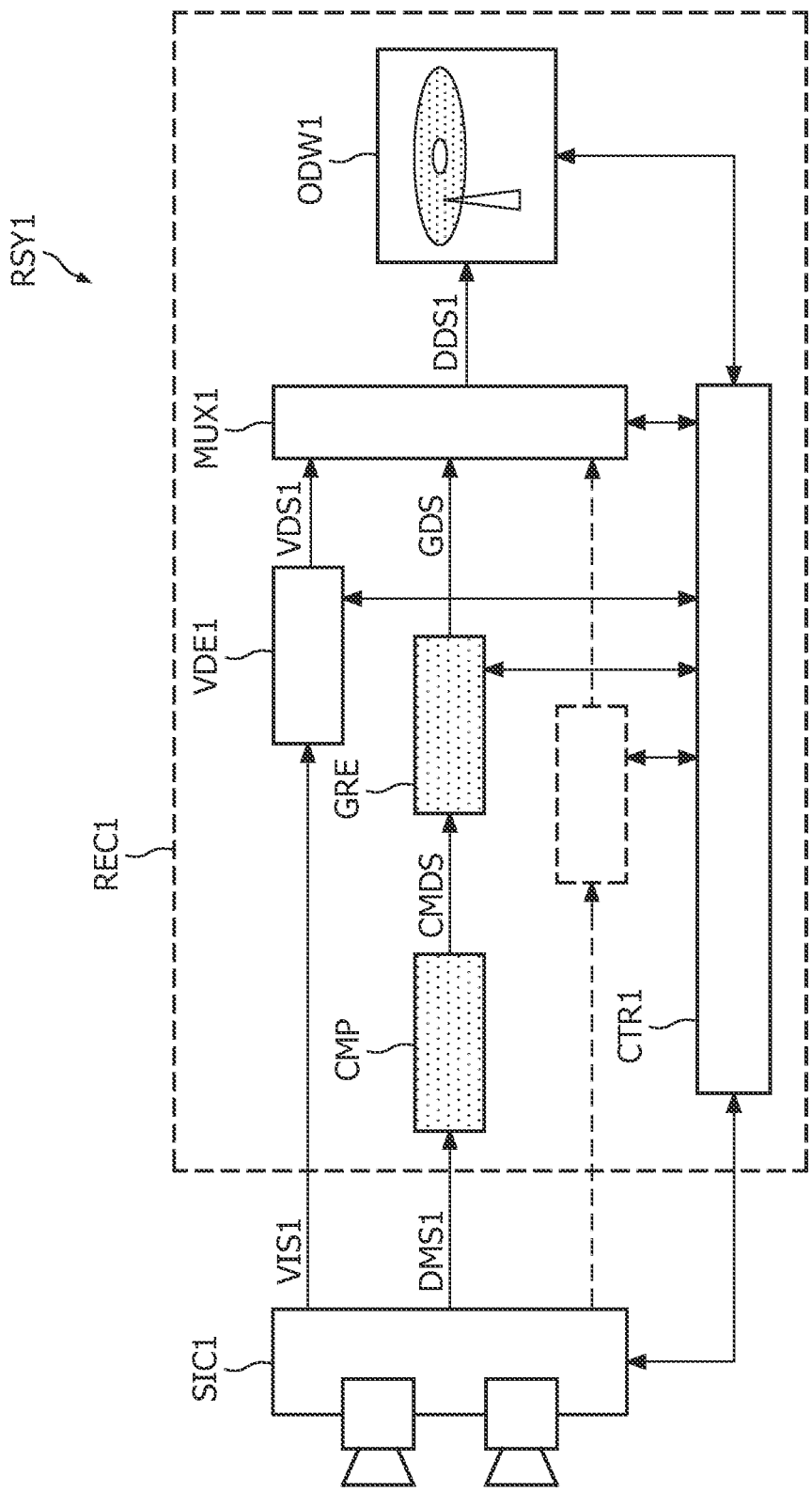
FIG. 1 is a block diagram that illustrates a stereoscopic video recording system.

FIG. 1 illustrates a stereoscopic video recording system RSY1, which comprises a stereoscopic image capturing device SIC1 and an optical recorder REC1. The stereoscopic image capturing device SIC1 may comprise, for example, a pair of cameras that capture a scene under slightly different angles. This allows determining a distance between an object in the scene and the stereoscopic image capturing device SIC1, which can be regarded as a virtual observer. Other techniques exist to determine such distances. For example, an infrared camera may be used in a radar-like approach.

The optical recorder REC1 comprises various functional entities: a video encoder VDE1, a depth map compressor CMP, a graphics encoder GRE, a multiplexer MUX1, and a controller CTR1. Any of these functional entities may be implemented by means of a software program that is loaded into a programmable processor. In such a software-based implementation, the software program causes the programmable processor to carry out specific operations that belong to the functional entity concerned. For example, a single programmable processor that is suitably programmed may implement the aforementioned functional entities. It should be noted that any functional entity can equally be considered as a processing step, or a series of processing steps. For example, the video encoder VDE1 can represent a video encoding step. The functional entities are merely described as if these were physical entities, rather than steps, for reasons of ease of description.

The optical recorder REC1 further comprises an optical disk writer ODW1, which may be of the DVD type or the Blu-ray disk type (DVD is an acronym for Digital Versatile Disk). The optical disk writer ODW1 may directly write data onto a writable optical disk. Alternatively, the optical disk writer ODW1 may produce a so-called master disk, which can serve as a basis for mass-production of optical disks.

The stereoscopic video recording system RSY1 basically operates as follows. The stereoscopic image capturing device SIC1 provides a sequence of visual images VIS1, which constitutes a video of the scene concerned. The visual images are two dimensional. The stereoscopic image capturing device SIC1 further provides a sequence of so-called depth maps DMS1, which accompanies the sequence of visual images VIS1. A depth map is associated with a particular visual image and provides information about respective distances that respective objects in the visual image have with respect to the virtual observer. That is, the depth map provides depth information for respective areas in the visual image. The sequence of depth maps allows a stereoscopic rendering of the scene concerned, which may also be referred to as a three-dimensional rendering.

Figure 3:
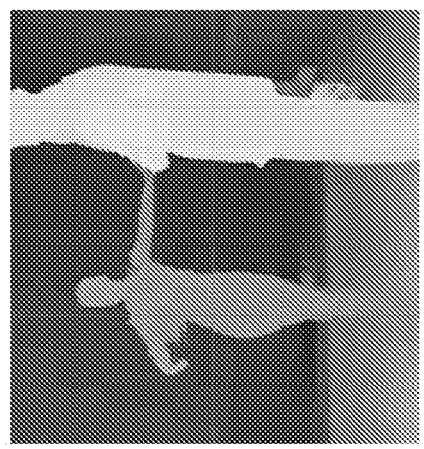
FIGS. 2 and 3 are pictorial diagrams that illustrate a visual image and a depth map associated therewith, respectively, which occur in the stereoscopic video recording system.
Figure 2:
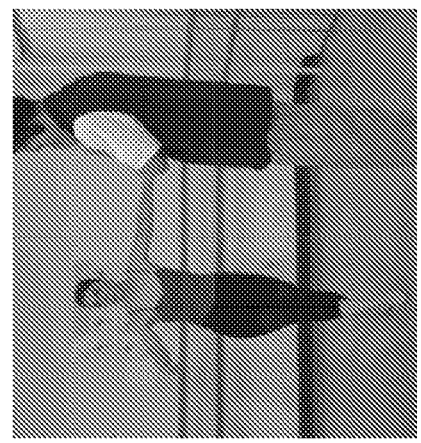

FIGS. 2 and 3 illustrate a visual image VI1 and a depth map DM1 associated therewith, respectively. The depth map DM1 may be in the form of a matrix of values, whereby each value is associated with a particular pixel in the visual image VI1. Since a pixel represents a particular portion of a particular object, the value that is associated with the pixel concerned represents the distance that this particular portion of this particular object has with respect to the virtual observer. There are various different fashions in which the value can express that distance. For example, the value may directly indicate the distance concerned. As another example, the value may indicate an amount of angular shift for the pixel concerned in a left eye view and a right eye view. Such values are commonly referred to as parallax values or disparity values.

FIG. 3 represents the depth map DM1 as a matrix of grayscale values, which provides a black-and-white image. A grayscale value may be expressed, for example, by means of 8 bits. In an ordinary notation, this means that the grayscale value is comprised in a range between 0 and 255. A grayscale value of 0 indicates a largest possible distance from the virtual observer. This corresponds with a darkest possible pixel in FIG. 3. Conversely, a grayscale value of 255 indicates a smallest possible distance from the virtual observer. This corresponds with a brightest possible pixel in FIG. 3. The depth maps have a spatial resolution that corresponds with that of the visual images. For example, the visual images and the depth maps may have a spatial resolution of 1920 by 1080 pixels.

The video encoder VDE1 illustrated in FIG. 1 encodes the sequence of visual images VIS1 that the stereoscopic image capturing device SIC1 provides. Accordingly, the video encoder VDE1 generates a video data stream VDS1, which may be in conformity with an MPEG standard, such as, for example MPEG-2 and MPEG-4 (MPEG is an acronym for Moving Pictures Expert Group). The video data stream VDS1 thus represents the sequence of visual images VIS1 in a compressed form.

The depth map compressor CMP reduces the spatial resolution of the depth maps that the stereoscopic image capturing device SIC1 provides. Accordingly, the depth map compressor CMP provides a sequence of compressed depth maps CDMS. For example, the depth map compressor CMP may sub-sample a depth map by a factor of 8 in a horizontal and a vertical direction. Let it be assumed that the visual images have a spatial resolution of 1920 by 1080 pixels and that the depth maps have the same resolution, as mentioned hereinbefore. In that case, a compressed image is obtained that has a spatial resolution of 240 by 135 pixels. Techniques other than sub-sampling may be used for compressing the depth maps so that fewer data is required to represent those. For example, a technique may be used that facilitates compensating a loss of a resolution that has occurred in compressing the depth maps.

Figure 4:
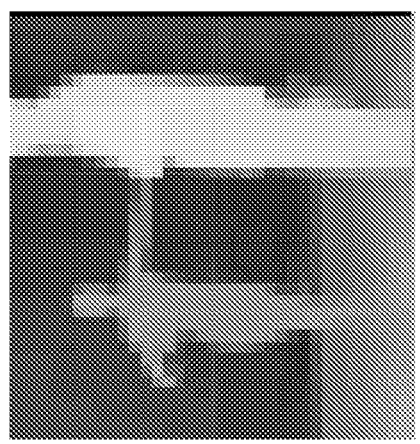
FIG. 4 is a pictorial diagram that illustrates a compressed depth map that has been obtained by sub-sampling the depth map illustrated in FIG. 3.

FIG. 4 illustrates a compressed depth map CDM that has been obtained by sub-sampling the depth map DM1 illustrated in FIG. 3 by a factor of 8. For the sake of clarity, the compressed depth map has been up-scaled by the same factor so that the aforementioned images have similar dimensions. FIG. 4 clearly illustrates that a loss in spatial resolution has occurred. A value in the compressed depth map CDM applies to a cluster of 8 pixels in the visual image VI1 associated therewith.

A value in the compressed depth map CMD conveys depth information that need not necessarily be correct for each pixel in the cluster to which the pixel applies. The cluster of pixels may comprise a group of pixels that belong to a particular object and another group of pixels that belong to another object. The one particular object may be relatively close to the virtual observer, whereas the other particular object may be relatively far away from the virtual observer. The value that applies to the cluster of pixels will be incorrect for at least one of the groups of pixels. Such an imprecision in a depth map may potentially cause unnatural effects in a stereoscopic rendering of the scene concerned.

However, there are techniques that allow a natural stereoscopic rendering of a scene on the basis of a depth map that has a relatively low spatial resolution. Some of these techniques use the visual image that is associated with the depth map to construct an enhanced depth map that is more precise. High-resolution information that is present in the visual image is effectively used for increasing the spatial resolution in the depth map. For example, the international application published under number WO 2005/034035 describes a technique for improving depth maps. The European application having filing number *(attorney's docket PH006957) describes another technique that can be used to advantage.

For example, a visual image allows determining that a cluster of pixels, for which a depth map provides a particular value, covers two different objects as described hereinbefore. Such a determination can be made because, for example, the two different objects have different properties in terms of luminance and chrominance. Accordingly, the visual image allows identifying an imprecision in the depth map. Moreover, the visual image allows making an appropriate correction. For each of the two different objects, there may be one or more neighboring clusters of pixels that exclusively belong to the object concerned and for which the depth map provides one or more values. These values, which provide relatively precise depth information, can be used to establish a set of appropriate values that can replace the value in the depth map that was found to be imprecise.

The graphics encoder GRE illustrated in FIG. 1 encodes the sequence of compressed depth maps CDMS as if the depth maps were graphics images to be recorded on, for example, a DVD disk or a Blu-ray disk. Accordingly, the graphics encoder GRE provides a graphics data stream GDS that represents the sequence of depth maps DMS1, which accompanies the sequence of visual images VIS1. In case of a DVD disk or a Blu-ray disk recording, the depth maps will be subjected to a run-length encoding, which is an effective data compression technique for graphics images. However, the run-length encoding will generally provide a relatively modest degree of data compression for depth maps, which are of the different nature. Nonetheless, the graphics data stream GDS should comply with bandwidth requirements as specified in the DVD disk or the Blu-ray disk standard of interest. This compliance is achieved thanks to the depth map compressor CMP described hereinbefore, which provides a sufficient degree of data compression. Moreover, a loss of spatial resolution, which may result from this data compression, can be compensated for as described hereinbefore.

The graphics data stream GDS may comprise different types of segments for different purposes. For example, let it be assumed that the optical recorder REC1 illustrated in FIG. 1 is used for a Blu-ray disk recording. In that case, the graphics data stream GDS comprises so-called graphics object segment and so-called composition segments. The graphics object segments carry the compressed depth maps in a run length encoded form, as if those images were graphics objects. The composition segments comprise information on how the graphics object should be formatted in a playback device. This formatting may include operations as, for example, cropping and object placement. A graphics processor within the playback device composes the graphics objects into a so-called graphics plane in accordance with the information comprised in the composition segments.

The controller CTR1 of the optical recorder REC1 ensures that the graphics data stream GDS, or a data stream associated therewith, comprises appropriate formatting information with regard to the compressed depth maps. This formatting information indicates how a depth map should be included in an output image for a display device, as if the depth map was a graphics image. For example, the formatting information may indicate that a playback device should effectively split the depth map into an upper portion and a lower portion. The formatting information may further indicate that the playback device should include values from the upper portion in the first few lines of an output image, and should include values from the lower portion in the last few lines of the output image. The other lines of the output image may convey the visual image that is associated with the depth map. This will be described in greater detail hereinafter.

The controller CTR1 further ensures that an optical disk, on which the video data stream VDS1 and the graphics data stream GDS are recorded, comprises suitable application data. The application data may comprise, for example, a menu that allows a user to view the scene that has been recorded on the optical disk in a two-dimensional mode or a three-dimensional mode. The application data may further comprise various playback definitions, which may be associated with one or more menu items. A playback definition can provide a particular rendering of multimedia content that has been recorded on the optical disk. To that end, a playback definition causes a playback device to select one or more particular data streams and, if necessary, one or more particular portions thereof. The playback definition further causes the playback device to make a particular composition of content comprised in these selected data streams and the selected portions thereof, if applicable.

The multiplexer MUX1 effectively combines all data that is to be recorded on an optical disk into a disk data stream DDS1. The multiplexer MUX1 does so in accordance with a standard that is applicable to the optical disk concerned. For example, the multiplexer MUX1 may insert appropriate headings that allow different types of data to be distinguished from each other. The multiplexer MUX1 may further carry out various operations that are content independent because, for example, these relate to physical aspects of the applicable standard. For example, the multiplexer MUX1 may carry out an error-correction coding.

The optical disk writer ODW1 may write the disk data stream DDS1 onto a writable optical disk in a conventional fashion. Alternatively, the optical disk writer ODW1 may write the disk data stream DDS1 onto a master disk, which is a kind of a mold. The master disk can be subsequently used for mass production of optical disks that comprise the disk data stream DDS1. These optical disks may be of the read-only type, such as, for example, a DVD with a movie recorded thereon.

An optical disk that has been recorded as described hereinbefore, allows a stereoscopic rendering of the scene concerned. To that end, the optical disk can be played on a playback device that operates in accordance with an existing standard such as, for example, a DVD or a Blu-ray disk standard. There is no need for a new standard or an extension of an existing standard.

Figure 5:
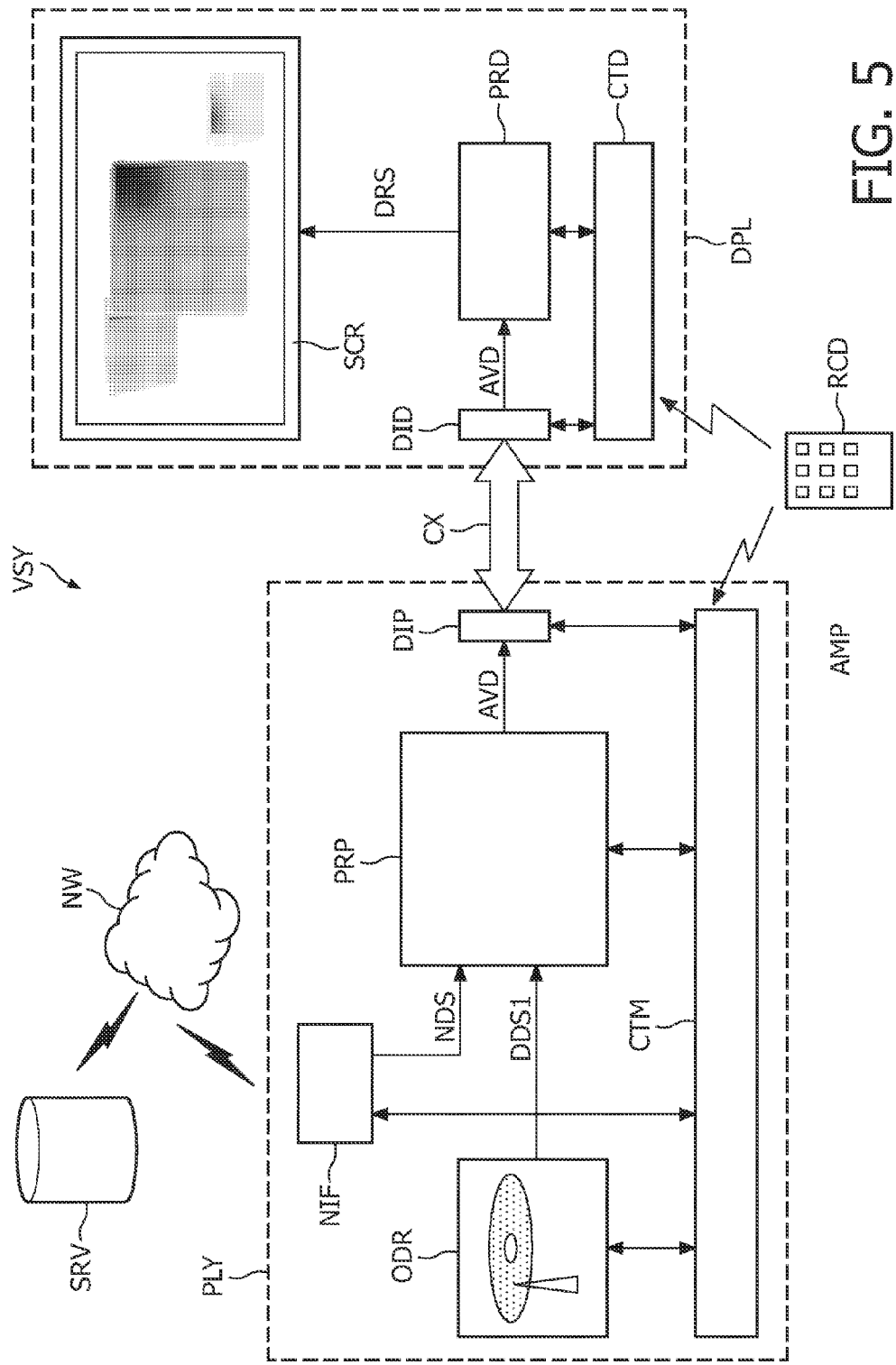
FIG. 5 is a block diagram that illustrates a video system, which can provide stereoscopic rendering.

FIG. 5 illustrates a video system VSY that comprises a playback device PLY and a display device DPL. The playback device PLY may be, for example, a DVD player or a Blu-ray disk player. The playback device PLY communicates with the display device DPL via a connection CX that is standardized, such as, for example, a Digital Visual Interface (DVI) or a High-Definition Multimedia Interface (HDMI). The display device DPL may be of the auto-stereoscopic type with a lenticular screen. Such a display device DPL allows a user to see stereo video, which provides a three-dimensional viewing experience, without having to wear particular glasses. The video system VSY may further comprises a remote control device RCD that allows a user to control the playback device PLY as well as the display device DPL. For example, the user may cause the video system VSY to display a menu from which he or she selects an item by means of the remote control device RCD.

The playback device PLY comprises an optical disk reader ODR, a playback processor PRP, a display interface DIP, and a main controller CTM. The playback device PLY may further comprise a network interface NIF for communicating with a remote server SRV via a network NW. The playback processor PRP may be in the form of a programmable processor that has been loaded with a suitable software program. The same applies to the main controller CTM and at least a portion of the display interface DIP and the network interface NIF. Various functional entities, such as, for example, the playback processor PRP and the main controller CTM, may be implemented by means of a single programmable processor.

The display device DPL comprises a display interface DID, a display processor PRD, a display controller CTD, and a screen that allows stereoscopic video rendering. For example, the screen SCR may comprise a liquid crystal (LCD) display and a sheet of lenticular lenses. The lenticular lenses diffract light that emanates from the display such that the left eye and the right eye of a viewer receive light from different pixels. Accordingly, a view that is displayed by means of a set of pixels can be directed towards the left eye. Another view that is simultaneously displayed by means of a different set of pixels can be directed towards the right eye. Such an auto-stereoscopic screen thus sacrifices resolution to render multiple views. A stereo image may thus have a relatively modest resolution, such as, for example, 960 by 540 pixels. The display processor PRD may be in the form of a programmable processor that has been loaded with a suitable software program. The same applies to the display controller CTD and at least a portion of the display interface DID.

The video system VSY basically operates as follows. Let it be assumed that a user has just inserted into the playback device PLY an optical disk that has been produced as described hereinbefore with reference to FIGS. 1-4. In an initial phase, the main controller CTM causes the optical disk reader ODR to read the application data that is stored on the optical disk. The main controller CTM uses the application data to present a menu to the user by means of the display device DPL. The menu may propose, for example, a playback of a given title in a two-dimensional mode or a three-dimensional mode. Let it be assumed that the user selects the three-dimensional mode, which is a particular rendering of multimedia content that is present on the optical disk. In response, the main controller CTM appropriately configures the playback processor PRP on the basis of one or more playback definitions, which are comprised in the application data and associated with the three-dimensional mode. The main controller CTM may carry out further operations so as to ensure the particular rendering that the user has selected.

Once the initial phase has been completed, the optical disk reader ODR provides the disk data stream DDS1 that comprises the multimedia content of interest. The playback processor PRP, which has appropriately been configured in the initial phase, processes the disk data stream DDS1 so as to obtain an audiovisual data stream AVD that corresponds with the particular rendering that the user has selected. The audiovisual data stream AVD comprises output images, which may be compositions of various different types of content, such as, for example, video and graphics. In addition, the playback processor PRP may include additional information in the audiovisual data stream AVD so as to assist the display device DPL in correctly interpreting this data stream. This will be described in greater detail hereinafter. The audiovisual data stream AVD reaches the display processor PRD of the display device DPL via the aforementioned display interfaces DIP, DID and the connection CX between the playback device PLY and the display device DPL. The display processor PRD processes the audiovisual data stream AVD so as to produce a driver signal DRS for the screen SCR.

Figure 6:
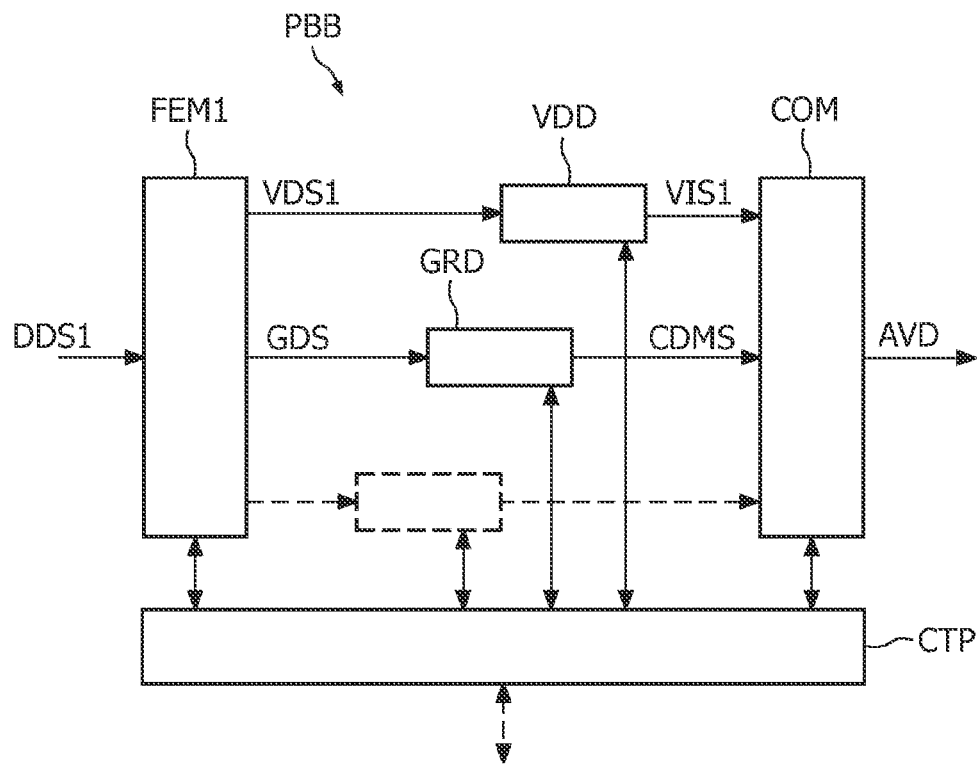
FIG. 6 is a block diagram that illustrates a basic implementation of a playback processor, which forms part of the video system.

FIG. 6 illustrates a basic implementation of the playback processor PRP, which can operate in accordance with the DVD standard or the Blu-ray disk standard. This implementation will be referred to hereinafter as basic playback processor PBB. The basic playback processor PBB comprises various functional entities: a front-end module FEM1, a video decoder VDD, a graphics decoder GRD, a composition module COM, and an internal controller CTP. The front-end module FEM1 may be in the form of a programmable processor that has been loaded with a suitable software program. The same applies to the other functional entities. All functional entities may be combined on a single processor that has been suitably programmed.

The playback processor PRP basically operates as follows. The front-end module FEM1 processes the disk data stream DDS1 from the optical disk reader ODR so as to retrieve various different data streams, which are present in the disk data stream DDS1 in a multiplexed form. To that end, the front-end module FEM1 carries out various operations, which may include error decoding and demultiplexing. Accordingly, the front-end module FEM1 retrieves the video data stream VDS1 and the graphics data stream GDS that were applied to the multiplexer MUX1 illustrated in FIG. 1.

The video decoder VDD decodes the video data stream VDS1 so as to obtain the sequence of visual images VIS1, or rather approximations thereof, which was applied to the video encoder VDE1 illustrated in FIG. 1. The graphics decoder GRD decodes the graphics data stream GDS so as to obtain the sequence of compressed depth maps CDMS, which was applied to the graphics encoder GRE illustrated in FIG. 1. The graphics decoder GRD further retrieves the formatting information that is included in the graphics data stream GDS, as described hereinbefore. It is recalled that the formatting information indicates how a depth map should be included in an output image for the display device DPL.

The composition module COM provides the audiovisual data stream AVD on the basis of the sequence of visual images VIS1, the sequence of compressed depth maps CDMS, and the formatting information. The audiovisual data stream AVD comprises a sequence of output images that are transmitted to the display device DPL via the connection CX illustrated in FIG. 5. An output image is a composition of a visual image and a compressed depth map associated therewith. The composition module COM makes such a composition on the basis of the formatting information, as if the compressed depth map were a graphics image. The composition module COM may obtain the formatting information directly from the graphics decoder GRD, or via the internal controller CTP. In the latter case, the internal controller CTP may effectively translate the formatting information into one or more composition instructions, which internal controller CTP applies to the composition module COM. In any case, the composition module COM carries out standard operations, as if it had to produce a standard image in which video information is overlaid with graphics information.

Figure 7:
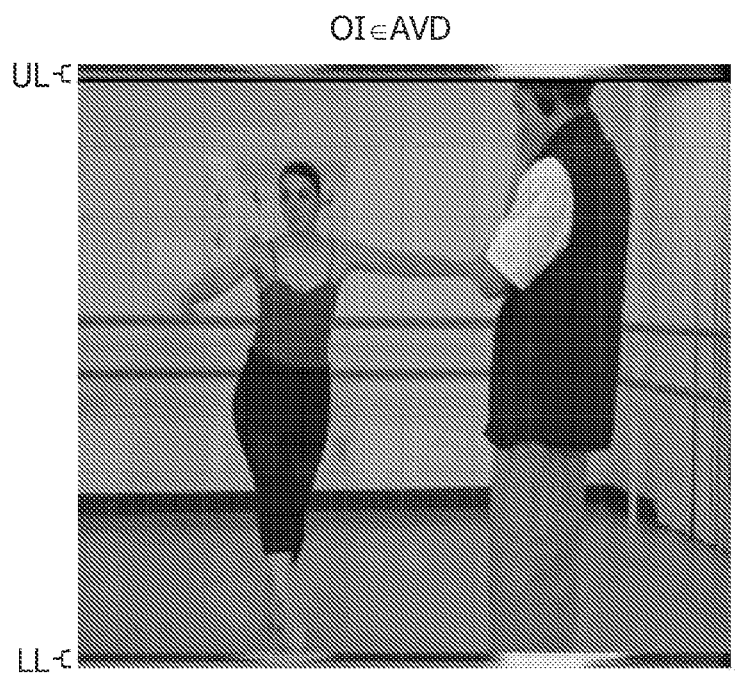
FIG. 7 is a pictorial diagram that illustrates an output image, which a playback device transmits to a display device in the video system.

FIG. 7 illustrates an output image OI within the audiovisual data stream AVD. The output image OI may be in form of, for example, a matrix of 1920 by 1080 pixels. That is, the output image OI may comprise 1080 lines of 1920 pixels each. The output image OI comprises a main portion that conveys a visual image. A set of upper lines UL and a set of lower lines LL convey the compressed depth map that is associated with the visual image. To that end, the compressed depth map has effectively been split into an upper half and lower half. The set of upper lines UL conveys the upper half, whereas the set of lower lines LL conveys the lower half of the compressed depth map. The inverse may also apply depending on the formatting information. The set of upper lines UL and the set of lower lines LL thus collectively carry values from the compressed depth map. It is recalled that such a value constitutes an indication of depth that applies to a cluster of pixels in the visual image. For example, in case the compressed depth map has been obtained by sub-sampling by a factor of 8 as described hereinbefore, a value applies to a cluster of 8 pixels in the visual image.

There are numerous different manners in which the composition module COM may effectively use pixels in an output image in order to convey depth information. For example, a pixel that has a given position within the output image may be given a grayscale value that corresponds with a value of a given position within a compressed depth map. Let it be assumed that the compressed depth map constitutes a matrix of 240 by 135 values. That is, the depth map comprises 135 lines of 240 values each. In that case, the first 135 pixels of the first line of the output image may be given respective grayscale values that correspond with the respective values of the first line of the depth map. The next 135 pixels of the first line of the output image, which can be referred to as pixels 136 to 270, may be given respective grayscale values that correspond with the respective values of the second line of the depth map, and so on. It should be noted that a value from a depth map can be mapped to any given type of value, or a set of values, that characterizes a pixel of an output image. A grayscale value is merely an example.

A more efficient manner of using pixels in an output image for conveying depth information is as follows. A pixel in the output image typically comprises three components, which determine the appearance of a pixel. For example, in case the output image is in the so-called RGB format, a pixel has red component, a green component, and a blue component. In case the output image is in the so-called YCC format, a pixel has a luminance component, a first luminance component, and a second chrominance component. In any case, each component of a pixel may carry a particular value that constitutes a depth indication. Accordingly, a pixel may convey three different values from a depth map. In case a line of the depth map comprises 135 pixels as described hereinbefore, the line can be accommodated in 45 pixels of an output image. In this respect, it should be noted that an 8-bit value typically provides a sufficiently precise depth indication. A pixel component is typically expressed by means of 8 bits. In a sense, pixel component resolution matches depth information resolution.

The composition module COM illustrated in FIG. 6 may embed a header in an output image. The header, which may be in the form of a sequence of bits or a sequence of bytes, provides an indication of where depth information is present in an output image. For example, the header may indicate that the first five lines and the last five lines of the output image comprise values that originate from the depth map. The header may further indicate a scheme according to which values were mapped from the depth map to the output image. The header may provide further indications that may be useful for appropriately rendering the output image, or rather the visual image comprises therein.

The header may be embedded in the output image in the following manner. A set of pixels is designated as carriers of bits from the header. The set of pixels is preferably designated so that between any given pair of pixels that belong to the set, there is at least one pixel in the output image that does not belong to the set. In other words, it is prevented that two neighboring pixels in the output image serve as header bit carriers. For each pixel that forms part of the set, a given pixel component is assigned a value that corresponds with one or more bits from the header. Preferably, each bit of the given pixel component is assigned an identical value, which represents a particular bit from the header. Such redundancy makes the header more robust against changes in brightness, contrast settings, and noise. In any case, the composition module COM applies a particular header embedding scheme that defines the pixels and the pixel components that carry header information.

Figure 8:
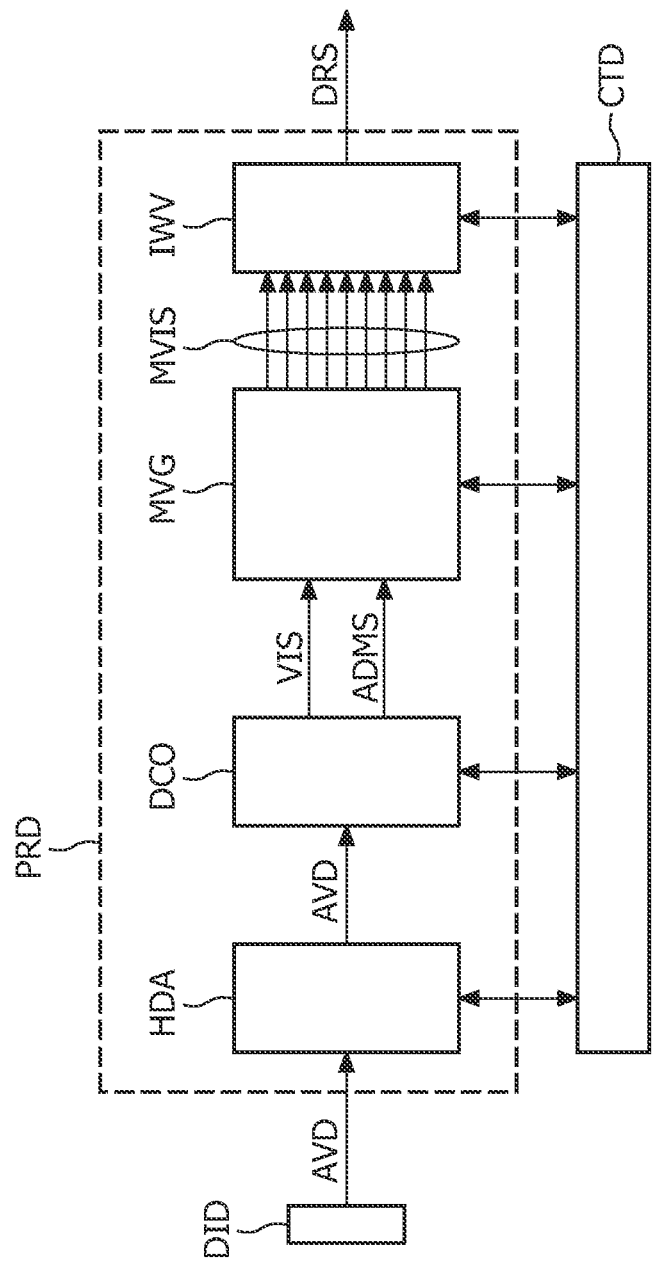
FIG. 8 is a block diagram that illustrates a display processor, which forms part of the video system.

FIG. 8 illustrates the display processor PRD, or rather an implementation thereof, together with the display interface DID and the display controller CTD. The display processor PRD comprises various functional entities: a header analyzer HDA, a decomposition module DCO, a multi-view generation module MVG, and an interweaving module IWV. The header analyzer HDA may be in the form of a programmable processor that has been loaded with a suitable software program. The same applies to the other functional entities. All functional entities, or at least portions thereof, may jointly be implemented on a single processor that has been suitably programmed.

The display processor PRD basically operates follows. The header analyzer HDA extracts a header that has been embedded in an output image, as described hereinbefore. To that end, the header embedding scheme may have been preprogrammed into the header analyzer HDA. Alternatively, the playback device PLY may have communicated the header embedding scheme to the display device DPL, for example, during an initialization phase that occurs when the display device DPL is connected to the playback device PLY. The header analyzer HDA may directly communicate header information to the decomposition module DCO. Alternatively, the display controller CTD may interpret the header so as to appropriately configure the decomposition module DCO.

In any case, the decomposition module DCO knows, as it were, where depth information is present in the output image. The decomposition module DCO can thus retrieve a visual image and a compressed depth map that are jointly comprised an output image within the audiovisual data stream AVD. Referring to FIG. 7, the decomposition module DCO effectively removes the set of upper lines UL and the set of lower lines LL, which comprise depth information, so that these lines are not displayed.

The decomposition module DCO further transforms a compressed depth map into an approximated depth map. The approximated depth map is more precise than the compressed depth map. This gain in precision may be achieved thanks to the visual image, which comprises relatively high-resolution visual information that is correlated depth information. Accordingly, the decomposition module DCO can identify an area for which the depth information in the compressed depth map is imprecise. Moreover, the decomposition module DCO can make an appropriate correction, and thus enhance precision, on the basis of information comprised in the visual image and the compressed depth map. This has been explained in greater detail with reference to the depth map compressor CMP illustrated in FIG. 1.

Figure 9:
FIG. 9 is a pictorial diagram that illustrates a visual image and an approximated depth map associated therewith, which are retrieved within the display processor.

FIG. 9 illustrates a visual image VI and an approximated depth map DM associated therewith, which the decomposition module DCO may provide. The visual image VI represents a house in front of which there is a tree. The house and the tree can also be identified in the depth map. More precisely, the tree has an outline that surrounds a white surface, which indicates that the tree is relatively close to a virtual observer. The house has an outline that surrounds a grayish surface, which indicates that the house is located further away from the virtual observer than the tree. A dark area in the depth map DM corresponds with a background in the visual image VI. Any background object is located relatively far away from the virtual observer.

Figure 10:
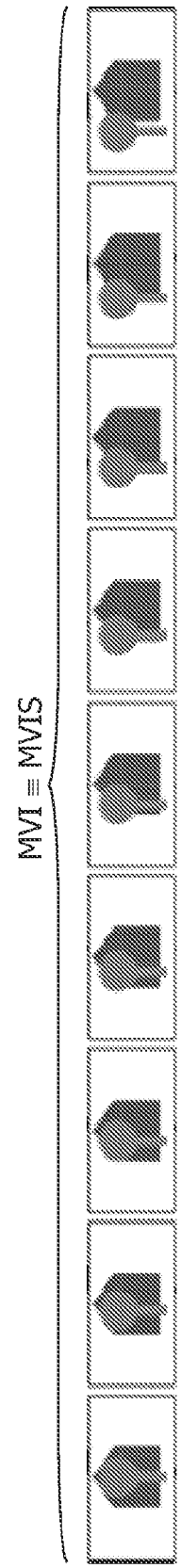
FIG. 10 is a pictorial diagram that illustrates nine different views, which are generated within the display processor.

FIG. 10 illustrates nine different views, which the multi-view generation module MVG generates on the basis of the visual image and the approximated depth map. Such a set of views will be referred to as multi-view image MVI hereinafter. Each view represents the house and the tree in front thereof seen from a particular viewing position. That is, there are nine viewing positions, which slightly differ. A slight change in the viewing position causes a relatively great displacement of the tree. This is due to the relatively small distance between the tree and the virtual observer. In contrast, the house moves to a relatively small extent throughout the views, because the house is located further away from the virtual observer.

The multi-view generation module MVG determines an appropriate displacement of an object between two different views on the basis of the approximated depth map. The closer the object is to the virtual observer, the greater the displacement is. An object that is deeply located, as it were, in the visual image will undergo a relatively small displacement or may even remain at the same location. Accordingly, a three-dimensional experience can be created on the basis of the approximated depth map.

The multi-view generation provides a sequence of multi-view images MVIS on the basis of a sequence of visual images VIS and an accompanying sequence of approximated depth maps ADMS, which the decomposition module DCO provides. The interweaving module IWV conveys the multi-view images to the screen SCR by means of the driver signal DRS. The screen SCR may be of the auto-stereoscopic type, as mentioned hereinbefore, and comprise a sheet of lenticular lenses. In that case, the interweaving module IWV ensures that a particular view is applied to a particular set of pixels on the screen SCR that have a particular location with respect to the sheet of lenticular lenses. Accordingly, the intermediate module ensures that each view is beamed, as it were, in an appropriate direction. This allows a stereoscopic viewing experience that does not require any particular glasses, which a viewer should have to wear.

Figure 11:
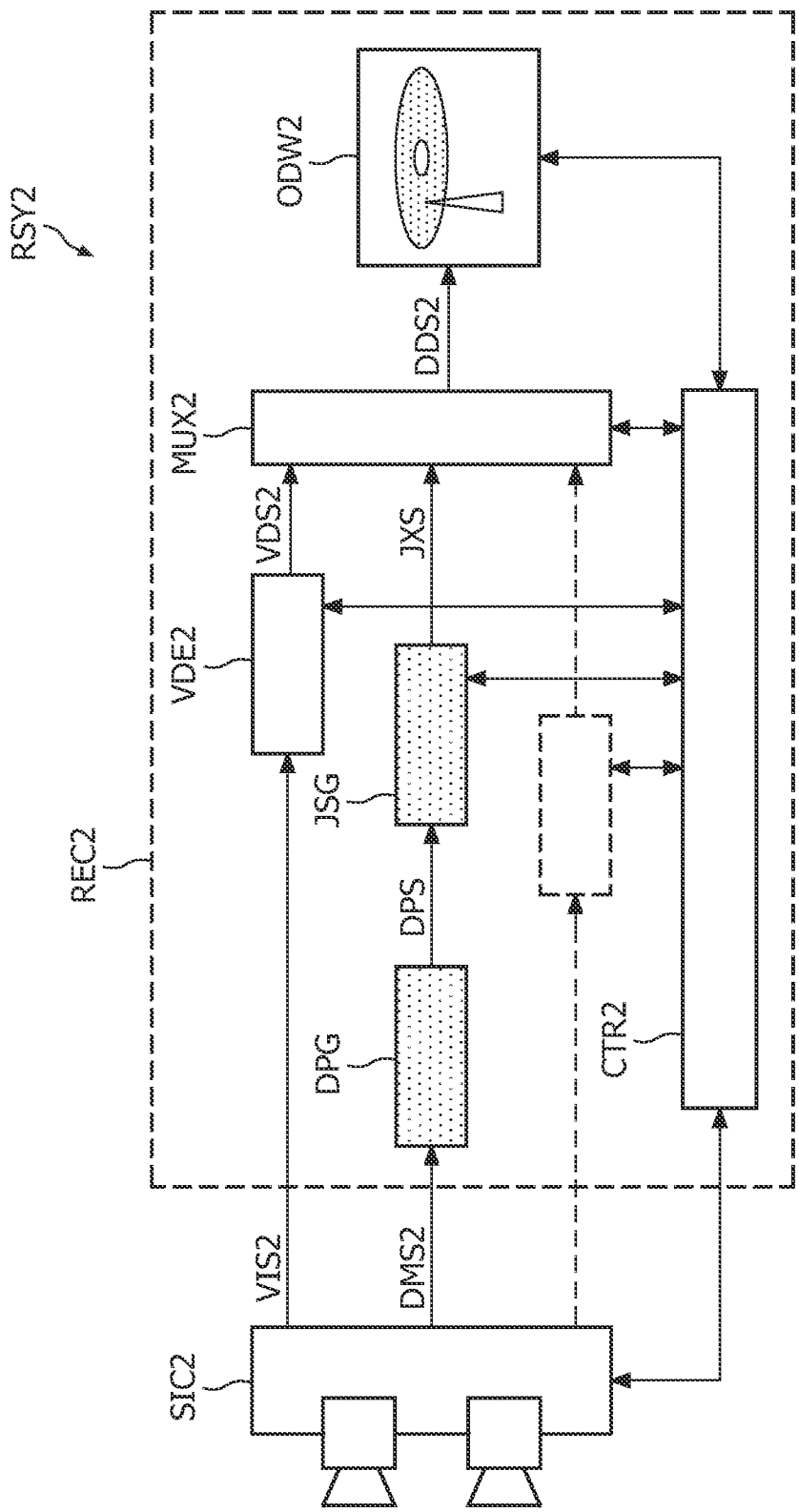
FIG. 11 is a block diagram that illustrates an alternative stereoscopic video recording system.

FIG. 11 illustrates an alternative stereoscopic video recording system RSY2, which will be referred to as program-oriented stereoscopic video recording system RSY2 hereinafter. The program-oriented stereoscopic video recording system RSY2 may be used, for example, to produce optical disks that comply with the Blu-ray disk standard. The program-oriented stereoscopic video recording system RSY2 comprises a stereoscopic image capturing device SIC2 and a program-oriented optical recorder REC2. The stereoscopic image capturing device SIC2 may be similar to the stereoscopic image capturing device SIC1 illustrated in FIG. 5, which was described hereinbefore.

The program-oriented optical recorder REC2 comprises two particular functional entities: a drawn-picture generator DPG and a Java-program generator JSG (Java is a registered trademark of Sun Microsystems). The program-oriented optical recorder REC2 further comprises the following functional entities: a video encoder VDE2, a multiplexer MUX2, a controller CTR2, and an optical disk writer ODW2. These functional entities may be similar to corresponding functional entities illustrated in FIG. 5, which were described hereinbefore. It should be noted that any functional entity can equally be considered as a processing step, or a series of processing steps. For example, the video encoder VDE2 can represent a video encoding step. The functional entities are merely described as if these were physical entities, rather than steps, for reasons of ease of description.

The program-oriented stereoscopic video recording system RSY2 basically operates as follows. The drawn-picture generator DPG receives a sequence of depth maps DMS2 from the stereoscopic image capturing device SIC2. In response, the drawn-picture generator DPG provides a sequence of drawn pictures DPS. A drawn picture constitutes an approximation a depth map from the stereoscopic image capturing device SIC2. This approximation is made by means of elementary graphic objects, which can be expressed by means of drawing primitives. For example, a straight line can be expressed by means of a drawing vector.

FIGS. 12 and 13 illustrate a depth map DM2 and a drawn picture DP, which the drawn-picture generator DPG has generated, respectively. The depth map DM2 is associated with a visual image that comprises a man, who has a foreground location, and an airplane, which has a background location. Accordingly, the depth map DM2 comprises a white object, which has an outline that corresponds with that of the man, and a gray object, which has an outline that corresponds with that of the airplane. The drawn picture DP comprises a white polygon, which approximates the outline of the man, and a gray polygon, which approximates the outline of the airplane. The white polygon can be expressed as a set of drawing vectors and a color-filling parameter that indicates white, and the gray polygon can be expressed as another set of drawing vectors and another color-filling parameter that indicates gray.

FIG. 14 illustrates a Java graphics program JX, which the Java-program generator JSG generates for an object in a drawn picture. A Java graphics program JX comprises a set of drawing primitives that represents the outline of the object concerned. The Java graphics program JX may further comprises a color definition. The color definition represents a value from the depth map that appropriately represents a distance of the object concerned with respect to a virtual observer. A range of different values that may occur in depth maps can thus be mapped to a range of different colors for Java graphic programs. The range of different colors may comprise, for example, grayscale values. The Java-program generator JSG illustrated in FIG. 11 may thus generate two sets of Java graphics programs for the drawn picture illustrated in FIG. 13: one set for the man and another set for the airplane.

The multiplexer MUX2 receives a stream of Java graphics programs JXS from the Java-graphics program generator JSG. The multiplexer MUX2 further receives a video data stream VDS2, which the video encoder VDE2 generates by encoding a sequence of visual images VIS2 that the stereoscopic image capturing device SIC2 provides. The multiplexer MUX2 operates in a fashion similar to that of the multiplexer MUX1 illustrated in FIG. 1, described hereinbefore. That is, the multiplexer MUX2 effectively combines all data that is to be recorded on an optical disk into a disk data stream DDS1, which data includes the stream of Java graphics programs JXS and the video data stream VDS2. The optical disk writer ODW2 operates in a fashion similar to that of the optical disk writer ODW2 illustrated in FIG. 1, described hereinbefore. Accordingly, an optical disk that has been recorded by means of the program-oriented stereoscopic video recording system RSY2 illustrated in FIG. 11, allows a stereoscopic rendering of the scene concerned on a Blu-ray disk playback device. There is no need for a new standard or an extension of the Blu-ray disk standard.

Let it be assumed that a Blu-ray disk playback device reads an optical disk that has been recorded as described hereinbefore with reference to FIGS. 11-14. The Blu-ray disk playback device may be similar to the playback device PLY illustrated in FIG. 5. A Blu-ray disk playback processor may be similar to the basic playback processor PBB illustrated in FIG. 6. That is, a front-end module in the Blu-ray disk playback processor will retrieve the stream of Java graphics programs JXS and the video data stream VDS2 from the disk data stream DDS2. A Java graphics program decoder in the Blu-ray disk playback processor will reconstruct the stream of drawn pictures from the stream of Java graphics programs JXS. A video decoder will decode the video data stream VDS2 so as to obtain a stream of visual images. A composition module will provide an audiovisual data stream that comprises a sequence of output images. These output images are compositions based on visual images and drawn pictures, which represent depth information. An output image may be similar to the output image OI illustrated in FIG. 7. A drawn picture can be included in a set of first lines and a set of last lines of output image, so that these lines convey depth information.

Figure 15:
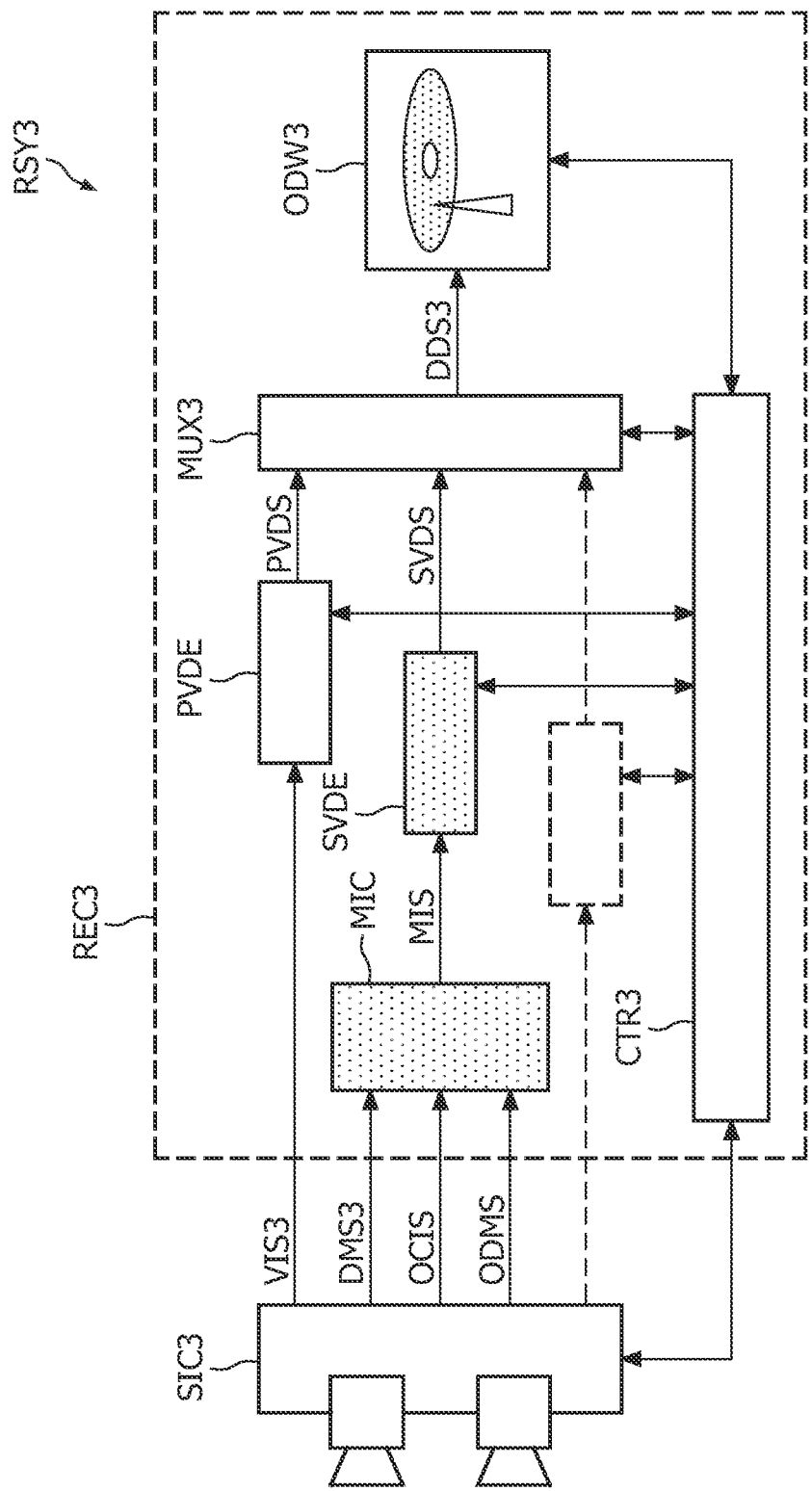
FIG. 15 is a block diagram that illustrates another alternative stereoscopic video recording system.

FIG. 15 illustrates another alternative stereoscopic video recording system RSY3, which will be referred to as PIP-oriented stereoscopic video recording system RSY3 hereinafter. The PIP-oriented stereoscopic video recording system RSY3 may be used, for example, to produce optical disks that comply with the Blu-ray disk standard. The PIP-oriented stereoscopic video recording system RSY3 comprises a stereoscopic image capturing device SIC3 and a PIP-oriented optical recorder REC3.

The stereoscopic image capturing device SIC3 may be similar to the stereoscopic image capturing device SIC1 illustrated in FIG. 5, which was described hereinbefore. That is, the stereoscopic image capturing device SIC3 provides a sequence of visual images VIS3 and a sequence of depth maps DMS3. In addition, the stereoscopic image capturing device SIC3 provides a sequence of occlusion images OCIS and a sequence of occlusion depth maps ODMS. An occlusion image and an occlusion depth map are associated with a particular visual image. The occlusion image provides information about one or more background objects, which are at least partially occluded by one or more foreground objects. That is, the occlusion image comprises an object, or a part of an object, that cannot be seen in the visual image due to occlusion. The occlusion depth map provides depth information relating to such objects, or parts of such objects, which are represented in the occlusion image.

The sequence of occlusion images OCIS and the sequence of occlusion depth maps ODMS may assist a stereoscopic video rendering system in providing a stereoscopic viewing experience that is artifact free. This can be explained with reference to FIGS. 9 and 10. In the visual image represented in FIG. 9, the tree occludes a portion of the house. In the nine views represented in FIG. 10, the portion of the house that is occluded becomes partially visible, except for a middle view that corresponds with the visual image represented in FIG. 9. That is, a view that is generated for stereoscopic rendering may comprise portions that are not present in the visual image on which the stereoscopic rendering is based. It is possible to approximately reconstruct these missing portions on the basis of information that is present in the visual image by means of so-called hole-filling techniques. However, hole-filling techniques may fall short in case an object that is partially occluded is relatively distant from a virtual observer.

An occlusion image comprises portions that are missing in a visual image, but which may be required for generating an appropriate set of different views for stereoscopic rendering. An occlusion image preferably comprises only a relevant border portion of an occluded area in the visual image. An occlusion depth map provides depth information concerning missing portions, which are represented in the occlusion image associated therewith.

The PIP-oriented optical recorder REC3 comprises two particular functional entities: a mosaic image composer MIC, and a secondary video encoder SVDE. The PIP-oriented optical recorder REC3 further comprises a primary video encoder PVDE, which is comparable with the video encoder VDE2 illustrated in FIG. 1, as well as a multiplexer MUX3, a controller CTR3, and an optical disk writer ODW3. These last mentioned functional entities may be similar to corresponding functional entities illustrated in FIG. 1, which were described hereinbefore. It should be noted that any functional entity can equally be considered as a processing step, or a series of processing steps. For example, the primary video encoder PVDE can represent a primary video encoding step. The functional entities are merely described as if these were physical entities, rather than steps, for reasons of ease of description.

The PIP-oriented stereoscopic video recording system RSY3 basically operates as follows. The primary video encoder PVDE provides a primary video data stream PVDS by encoding the sequence of visual images VIS3. The primary video data stream PVDS is comparable with the video data stream VDS1 that is produced by the video encoder VDE1 illustrated in FIG. 1. The mosaic image composer MIC provides a stream of mosaic images MIS on the basis of the sequence of depth maps DMS3 from the stereoscopic image capturing device SIC3, the sequence of occlusion images OCIS, and the sequence of occlusion depth maps ODMS. A mosaic image is a mosaic of a depth map, an occlusion image, and an occlusion depth map, which all relate to the same visual image.

Figure 16:
FIGS. 16 and 17 are pictorial diagrams that illustrate a visual image and a mosaic image associated therewith, respectively, which occur in the other alternative stereoscopic video recording system.
Figure 17:
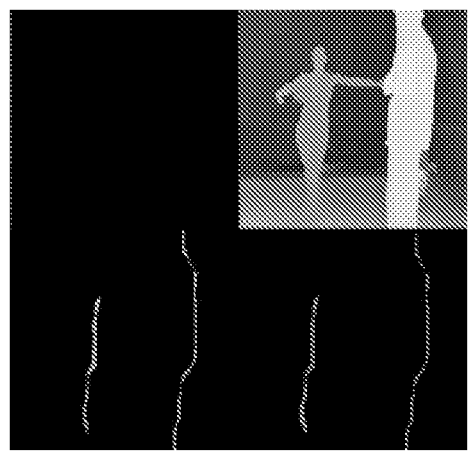

FIGS. 16 and 17 illustrate a visual image VI3 and a mosaic image MI associated therewith. The mosaic image MI has four quadrants: an upper left quadrant, an upper right quadrant, a lower left quadrant, and a lower right quadrant. The upper left quadrant is empty. The upper right quadrant comprises a scaled version of the depth map, which will be referred to as scaled depth map hereinafter. The scaled depth map has a resolution that is half of that of the visual image in a horizontal and vertical direction. The lower left quadrant comprises a scaled version of the occlusion image, which will be referred to as scaled occlusion image hereinafter. The lower right quadrant comprises a scaled version of the occlusion depth map, which will be referred to as scaled occlusion depth map hereinafter.

The secondary video encoder SVDE encodes the stream of mosaic images MIS as if these images were ordinary visual images intended for a so-called picture-in-picture (PIP) display. The secondary video encoder SVDE may apply an encoding scheme that is similar to that of the primary video encoder PVDE, such as, for example, an MPEG-2 or an MPEG-4 encoding scheme. Accordingly, the secondary video encoder SVDE provides a secondary video data stream SVDS that represents the mosaic images, which comprises depth information as well as occlusion information.

The controller CTR3 ensures that an optical disk, on which the primary video data stream PVDS and the secondary video data stream SVDS are recorded, comprises suitable application data. The application data comprises a menu item for rendering content that has been recorded on the optical disk in a three-dimensional mode. The application data further comprises a particular playback definition that is associated with this menu item. This playback definition for a stereoscopic rendering defines that a playback device should process the primary video data stream PVDS as a secondary video stream, and vice versa. That is, this playback definition causes a playback device to process visual images as if these were picture-in-picture images.

The multiplexer MUX3 receives the primary video data stream PVDS and the secondary video data stream SVDS. The multiplexer MUX3 may receive other data streams. The multiplexer MUX3 basically operates in a fashion similar to that of the multiplexer MUX3 illustrated in FIG. 1, described hereinbefore. That is, the multiplexer MUX3 effectively combines all data that is to be recorded on an optical disk into a disk data stream DDS3. This data includes the application data mentioned hereinbefore, which defines that, for stereoscopic rendering, a playback device should process the primary video data stream PVDS as a secondary video stream, and vice versa. The optical disk writer ODW3 operates in a fashion similar to that of the optical disk writer ODW1 illustrated in FIG. 1, described hereinbefore. Accordingly, an optical disk that has been recorded by means of the PIP-oriented stereoscopic video recording system RSY3 illustrated in FIG. 15, allows a stereoscopic rendering of the scene concerned on a Blu-ray disk playback device. There is no need for a new standard or an extension of the Blu-ray disk standard.

As mentioned hereinbefore, the playback device PLY illustrated in FIG. 5 may represent a Blu-ray disk player. Let it be assumed that a user has just inserted into the player an optical disk that has been produced as described hereinbefore with reference to FIGS. 15-17. In an initial phase, the main controller CTM causes the optical disk reader ODR to read the application data that is stored on the optical disk. The main controller CTM uses the application data to present a menu to the user by means of the display device DPL. The menu may propose, for example, a playback of a given title in a two-dimensional mode or a three-dimensional mode. Let it be assumed that the user selects the three-dimensional mode, which is a particular rendering of multimedia content that is present on the optical disk. In response, the main controller CTM appropriately configures the playback processor PRP on the basis of one or more playback definitions that are comprised in the application data. The main controller CTM may carry out further operations so as to ensure the particular rendering that the user has selected.

Figure 18:
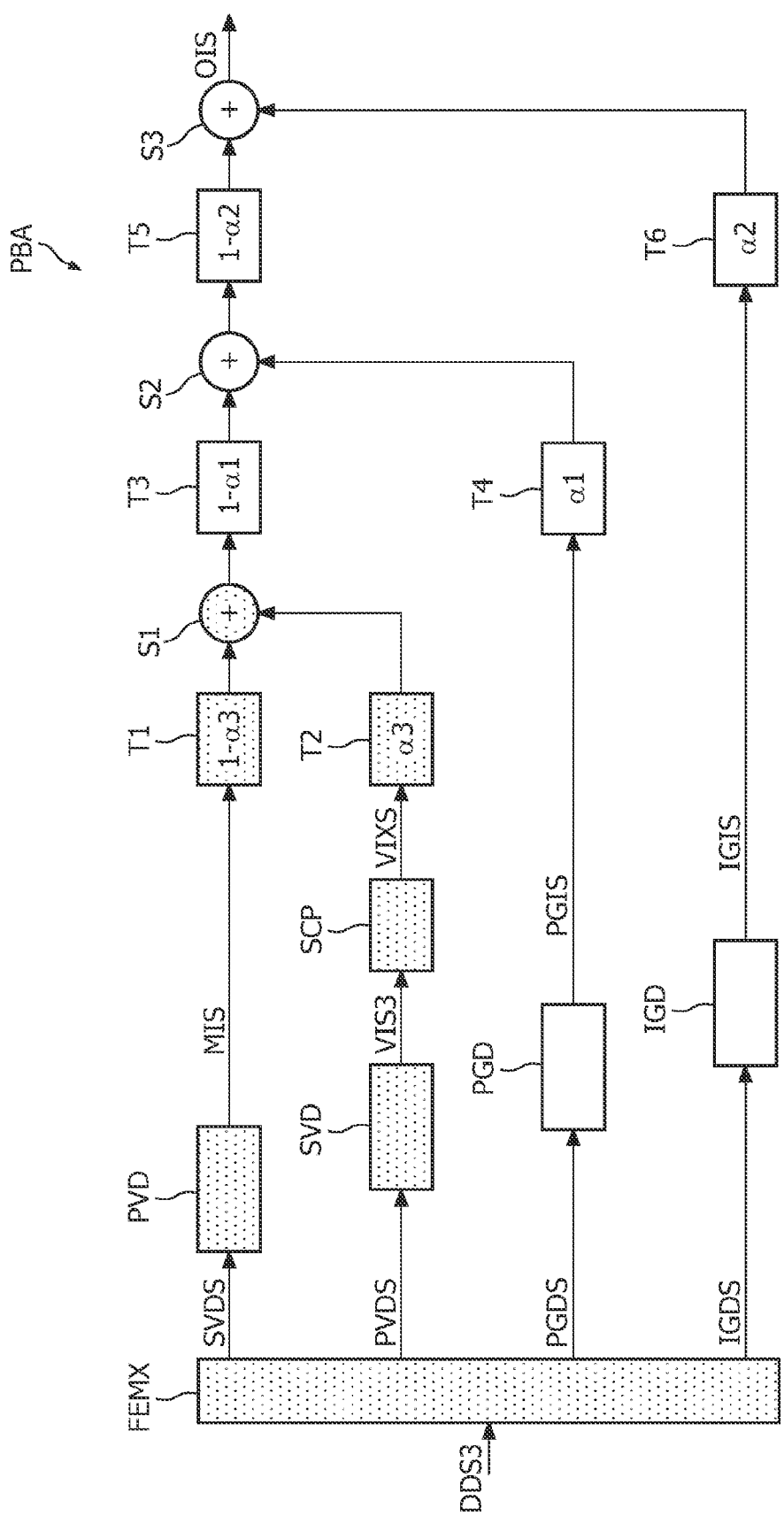
FIG. 18 is a block diagram that illustrates an advanced implementation of the playback processor, which forms part of the video system illustrated in FIG. 5.

FIG. 18 illustrates an advanced implementation of the playback processor PRP, which can process the disk data stream DDS3 in accordance with the Blu-ray disk standard and, in particular, in accordance with the high definition movie (HDMV) mode. This implementation will be referred to hereinafter as advanced playback processor PBA. The advanced playback processor PBA comprises various functional entities: a front-end module FEMX, a primary video decoder PVD, a secondary video decoder SVD, a presentation-graphics decoder PGD, an interactive-graphics decoder IGD. The front-end module FEMX may functionally be compared with the front-end module FEM in the basic playback processor PBB illustrated in FIG. 6. The primary video decoder PVD and the secondary video decoder SVD are functionally equivalent.

The advanced playback processor PBA further comprises a scaling-and-positioning processor SCP, various transparency-control modules T1-T6, and various summing modules S1-S3. A combination of the last-mentioned functional entities corresponds with the composition module COM illustrated in FIG. 6. The signs a1-a3 represent transparency-control coefficients. Any of the aforementioned modules may be in the form of a programmable processor that has been loaded with a suitable software program. All functional entities may be combined on a single processor that has been suitably programmed.

The advanced playback processor PBA basically operates as follows. In the initial phase described hereinbefore, the front-end module FEMX has been configured to apply the primary video data stream PVDS, which represents visual images, to the secondary video decoder SVD. The front-end module FEMX has further been configured to apply the secondary video data stream SVDS, which represents mosaic images, to the primary video decoder PVD. That is, the front-end module FEMX has been instructed to apply a change of roles, as it were. The primary video decoder PVD retrieves the stream of mosaic images MIS, or rather approximations thereof. The secondary video decoder SVD retrieves the stream of visual images VI3, or rather approximations thereof.

The scaling-and-positioning module SCP scales the visual images. More precisely, a visual image is reduced by a factor of 2 in a horizontal and vertical direction. For example, let it be assumed that the visual image comprises 1080 lines of 1920 pixels each. In that case, the scaling module provides a scaled visual image that comprises 540 lines of 960 pixels each. The scaling- and positioning module places the scaled visual image in an upper-left quadrant of an output image that comprises 1080 lines of 1920 pixels each. Transparency-control modules T1 and T2 cause the upper left quadrant of the output image to correspond with the scaled visual image and the other quadrants of the output image to correspond with a mosaic image that is associated with the visual image concerned. Transparency-control coefficient $\alpha 3$ is equal to 1 in the upper left quadrant, whereas this transparency-control coefficient is equal to 0 in the other quadrants. Accordingly, the scaling-and-positioning module SCP provides a stream of scaled-and-positioned visual images VIXS that is effectively combined with the stream of mosaic images MIS by means of transparency-control modules T1 and T2 and summing module S1.

Figure 19:
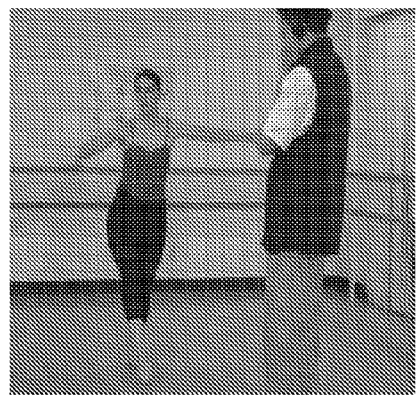
FIGS. 19-22 are pictorial diagrams that illustrate various images that occur in the advanced implementation of the playback processor.
Figure 20:
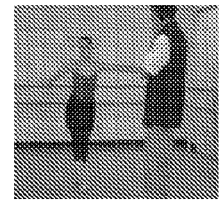
Figure 21:
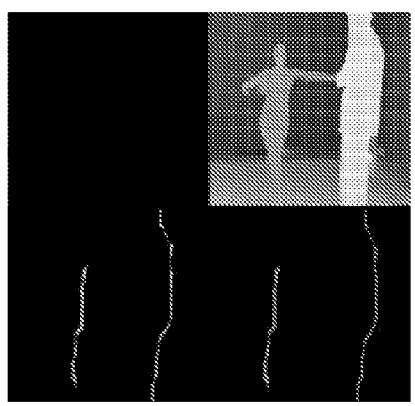
Figure 22:
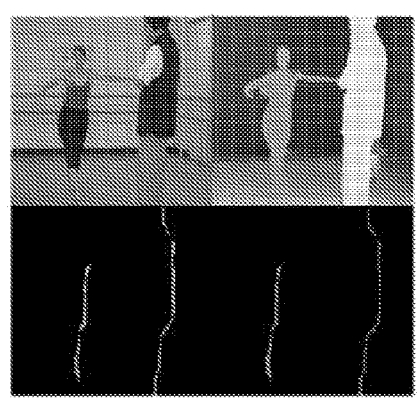

FIGS. 19-22 illustrate various images that occur in the advanced playback processor PBA described hereinbefore. FIG. 19 illustrates a visual image VI3 that the secondary video decoder SVD provides by decoding the primary video data stream PVDS, which is present on the optical disk concerned. FIG. 20 illustrates a scaled visual image VIX that the scaling-and-positioning module SCP establishes by scaling the visual image VI3 illustrated in FIG. 19. FIG. 21 illustrates a mosaic image MI that the primary video decoder PVD provides by decoding the secondary video data stream SVDS. The mosaic image MI is associated with the visual image VI3 illustrated in FIG. 19 and comprises a depth map in an upper-right quadrant, an occlusion image in the lower-left quadrant, and an occlusion depth map in the lower-right quadrant. FIG. 22 illustrates an output image OIX that is obtained by overlaying the scaled visual image VIX on the mosaic image MI as if the scaled visual image were a picture-in-picture image.

Accordingly, the advanced playback processor PBA may provide a stream of output images OIS that comprises visual information, depth information, occlusion information, and occlusion depth information in specific areas. As explained hereinbefore with reference to the basic playback processor PBB illustrated in FIG. 6, an output image may comprise a header that indicates different areas into which the output image is divided and the type of information that can be found in each different area. Accordingly, a display device can distinguish between different output image formats such as those illustrated in FIGS. 7 and 22. The display device can then process the output image in an appropriate fashion. Alternatively, a display device may be preprogrammed to process a particular output image format or may be configured to do so in an initialization phase prior to a rendering phase.

It should be noted that the advanced playback processor PBA illustrated in FIG. 18 may also operates in a conventional fashion, wherein the front-end module FEMX retrieves a presentation-graphics data stream PGDS and an interactive-graphics data stream IGDS from a disk data stream DDS3. The presentation-graphics decoder PGD and the interactive-graphics decoder IGD provide a stream of presentation graphics images PGIS and a stream of interactive graphics images IGIS, respectively, by decoding the aforementioned data streams. A presentation graphic image or an interactive graphics image may be combined with a visual image by means of transparency-control modules T3-T6 and summing modules S2, S3.

CONCLUDING REMARKS

The detailed description hereinbefore with reference to the drawings is merely an illustration of the invention and the additional features, which are defined in the claims. The invention can be implemented in numerous different manners. In order to illustrate this, some alternatives are briefly indicated.

The invention may be applied to advantage in any type of product or method that involves stereoscopic image rendering. A stereoscopic rendering system that comprises an optical disk player, as illustrated in FIG. 5, is merely an example. The invention may equally be applied to advantage in, for example, a receiver that is arranged to receive and process a data stream in conformity with, for example, the Blu-ray disk standard. Such a data stream may reach the receiver via a network, such as, for example, the Internet. A data carrier need not necessarily be in the form of an optical disk. For example, a writable memory that may be in the form of an integrated circuit can comprise a data assembly that has been obtained by encoding one more images in accordance with the invention. The invention does not require any particular type of stereoscopic display device. An auto-stereoscopic display, which was mentioned in the detailed description, is merely an example. The stereoscopic display device may also be of a type that requires a viewer to wear a pair of glasses: one of which passes a left-eye view, or a sequence thereof, to the left eye, the other glass passing a right-eye view, or a sequence thereof, to the right eye. Such a stereoscopic display device alternately displays left-eye views and right-eye views.

There are numerous ways of encoding an image in accordance with the invention. FIGS. 1 and 11 illustrate examples in which a depth map is encoded as a graphics image and a Java-based graphics image, respectively. In other implementations, the depth map may be combined with occlusion data and occlusion depth data as in FIG. 15. That is, stereo-enabling data may exclusively comprise depth information or a combination of depth information and occlusion information, and even further information that contributes to satisfactory stereoscopic rendering.

There are numerous different ways of making stereo-enabling data available to a reproduction device. In the example described with reference to FIG. 5, the stereo-enabling data has been recorded together with visual data on an optical disk. However, the playback device PLY may retrieve stereo-enabling data from the server SRV via the network NW and the network interface NIF. The playback processor PRP may thus receive stereo-enabling data in the form of a network data stream NDS from the network interface NIF. A user, who selects a stereoscopic rendering mode for content that is present on the optical disk, may trigger such a retrieval of stereo-enabling data that is associated with the content concerned. The application data, which is also present on the optical disk, may indicate a particular Internet address, or a set of such addresses, where the stereo-enabling data can be retrieved. The retrieval may be subject to a payment.

There are numerous different ways in which stereo-enabling information can be included in an output image, which can be transmitted to a display device DPL. FIG. 7 illustrates an implementation in which the stereo-enabling information is included, as is, in the set of upper lines UL and the set of lower lines LL. In another implementation, the stereo-enabling information may be multiplied with a random signal so as to obtain randomized stereo-enabling information, which is included in the set of upper lines UL and the set of lower lines LL. A display device can multiply the randomized stereo-enabling information with a corresponding random signal so as to retrieve the stereo-enabling information. Such an approach can be advantageous in case a user erroneously selects a menu item for stereoscopic rendering whereas he or she does not have a display device that allows stereoscopic rendering. In such a case, an output image that includes stereo-enabling information will be displayed, such as, for example, the output image illustrated in FIG. 7. The user may consider the set of upper lines UL and the set of lower lines LL as bizarre and annoying, not realizing that he or she has made a mistake. In case the stereo-enabling information occurs in the output image in a randomized form, the set of upper lines UL and the set of lower lines LL may appear less bizarre and less annoying.

There are numerous different ways in which a stereoscopic viewing experience can be achieved with an image that has been encoded in accordance with the invention. FIG. 8 illustrates an implementation in which the display processor PRD is arranged to detect a particular format of an output image. In another implementation, a display processor may be preprogrammed to interpret and process an output image in accordance with a particular format. In yet another implementation, the display processor may analyze an output image, or a series of output images, so as to identify one or more particular areas in which stereo-enabling data may be present. Such an automatic detection can be based on statistical analysis: there will be a discontinuity between an area that comprises visual data and an area that comprises stereo-enabling data. Moreover, the discontinuity will occur in each image.

Any of the examples illustrated in FIGS. 1, 5, 6, 8, 11, 15, and 18 may be implemented in the form of a method. That is, any block that occurs in these figures can represent one or more particular steps of a method. For example, the block designated VDE1 in FIG. 1 represents a video encoding step as well as a video encoder. The block designated GRE in FIG. 1 represents a graphics encoding step as well as a graphics encoder. The block designated MUX1 in FIG. 1 represents a multiplexing step as well as a multiplexer, and so on for each block in each of the aforementioned figures which can be interpreted as flowcharts.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function. It should be noted that any of the functional entities illustrated in FIG. 2 may be implemented by means of software or hardware, or a combination of software and hardware. For example, any functional entity may be implemented by suitably programming a programmable processor, which is a software-based implementation, or in the form of a dedicated circuit, which is a hardware-based implementation. Hybrid implementations may involve one or more suitably programmed processors as well as one or more dedicated circuits.

The remarks made herein before demonstrate that the detailed description and the drawings which it refers to illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

The invention claimed is:

1. An image encoding method that allows stereoscopic rendering, the image encoding method, operable in a processor, causing the processor to execute the steps comprising:
 a primary encoding step (VDE1; VDE2; PVDE) in which a visual image is encoded in accordance with a standard;
 an auxiliary encoding step (GRE; JSG; SVDE) in which stereo-enabling data that is associated with the visual image is encoded as if the stereo-enabling data was an auxiliary image that can be combined with the visual image in accordance with the standard concerned, the stereo-enabling data comprising respective values that indicate respective distances between respective areas in the visual image and a virtual observer;
 a composition definition step (CTR1; CTR2; CTR3) in which a composition definition is provided that causes a decoding device, which operates in accordance with the standard, to include the stereo-enabling data in at least one specific area of an output image, which can be transmitted to a display device (DPL).

2. An image encoding method as claimed in claim 1, also comprising:
 a compression step (CMP; DPG) in which original stereo-enabling data is compressed so as to obtain the stereo-enabling data that is encoded in the auxiliary encoding step (GRE; JSG; SVDE), said compression step comprising a sub-sampling step in which the original stereo-enabling data is sub-sampled so that the stereo-enabling data that is encoded has a resolution that is lower than that of the original stereo-enabling data.

3. An image encoding method as claimed in claim 1, whereby, in the composition definition step (CTR1), the composition definition that is provided causes a decoding device to insert a portion of the stereo-enabling data in at least one of the following set of lines of the output image: a set of the upper lines (UL) and a set of lower lines (LL).

4. An image encoding method as claimed in claim 2, whereby, in the auxiliary encoding step (GRE), the stereo-enabling data is encoded as a graphics image in accordance with at least one of the following two standards: a DVD standard or a Blu-ray disk standard.

5. An image encoding method as claimed in claim 4, the composition definition step (CTR1) comprising:
 a formatting step in which the composition definition is included in a composition segment that is associated with the graphics image.

6. An image encoding method as claimed in claim 2, the compression step comprising:
 a drawn-picture generation step (DPG) in which a drawn picture is generated, which represents the stereo-enabling data by way of approximation, the drawn picture comprising elementary graphics objects, which can be expressed by means of drawing primitives, at least one set of drawing primitives being generated on the basis of the drawn picture.

7. An image encoding method as claimed in claim 6, whereby, in the auxiliary encoding step (JSG), the drawing primitives are expressed in the form of a Java program that can be included in an interactive graphics data stream GDS in accordance with a Blu-ray disk standard.

8. An image encoding method as claimed in claim 1, whereby, in the auxiliary encoding step (SVDE), the stereo-enabling data is encoded as an auxiliary visual image, which is to be displayed in a picture-in-picture fashion, and, in the composition definition step (CTR3), the composition definition that is provided causes the decoding processor concerned to insert a scaled version of the visual image into the auxiliary visual image in a picture-in-picture fashion, as if the auxiliary visual image was a main visual image and the visual image a sub-image.

9. An image encoding method as claimed in claim 8, comprising:
 a mosaic image forming step (MIC) in which the stereo-enabling data is formed by a mosaic of a depth map, which comprises the respective values that indicate respective distances between respective areas in the visual image and the virtual observer, and at least one conclusion image, which represents one or more background objects that are at least partially occluded by one or more foreground objects in the visual image.

10. An image encoding method as claimed in claim 1, comprising:
 a menu definition step in which a menu is defined that comprises an item for stereoscopic rendering, the item for stereoscopic rendering being associated with the composition definition so that when the item for stereoscopic rendering is selected, the decoding device includes the stereo-enabling data in the at least one specific area of the output image, which is to be transmitted to the display device (DPL).

11. A non-transitory data carrier that complies with a standard, the data carrier including data thereon, said data comprising:
 primary encoded data (VDS1, VDS2, PVDS) that represents a visual image in accordance with the standard;
 auxiliary encoding data (GDS, JXS, SVDS) that represents stereo-enabling data, which is associated with the visual image, as if the stereo-enabling data was an auxiliary image that can be combined with the visual image in accordance with the standard concerned, the stereo-enabling data comprising respective values that indicate respective distances between respective areas in the visual image and a virtual observer; and
 composition definition data that causes a decoding device to include the stereo-enabling data in at least one specific area of an output image, which can be transmitted to a display device (DPL).

12. An image encoder (RSY1, RSY2, RSY3) comprising:
 a primary encoding module (VDE1; VDE2; PVDE) for encoding a visual image encoded in accordance with a standard;
 an auxiliary encoding module (GRE; JSG; SVDE) for encoding stereo-enabling data, which is associated with the visual image, as if the stereo-enabling data was an auxiliary image that can be combined with the visual image in accordance with the standard concerned, the stereo-enabling data comprising respective values that indicate respective distances between respective areas in the visual image and a virtual observer; and
 a composition definition module (CTR1; CTR2; CTR3) for providing a composition definition that causes the stereo-enabling data in at least one specific area of an output image.

13. An image decoder (PLY) comprising a processor (PRP) arranged to handle:
 primary encoded data (VDS1, VDS2, PVDS) that represents a visual image in accordance with the standard, and auxiliary encoding data (GDS, JXS, SVDS) that represents stereo-enabling data, which is associated with the visual image, as if the stereo-enabling data was an auxiliary image that can be combined with the visual image in accordance with the standard concerned, the stereo-enabling data comprising respective values that indicate respective distances between respective areas in the visual image and a virtual observer; and composition definition data that causes a decoding device to include the stereo-enabling data in at least one specific area of an output image, which can be transmitted to a display device (DPL);

said processor (PRP) being also arranged to provide an indication to a display device (DPL) of the at least one specific area in the output image that comprises the stereo-enabling data, said processor providing the indication in the form of a header that is embedded in the output image.

14. A computer program product stored on a non-transitory medium, said computer program product comprising a set of instructions, which when loaded into a programmable processor, causes the programmable processor to carry out the image encoding method as claimed in claim 1.

\* \* \* \* \*